(12) United States Patent
Valente

(10) Patent No.: US 7,837,588 B2
(45) Date of Patent: Nov. 23, 2010

(54) PRE-LOAD MECHANISM FOR HELICAL GEAR DIFFERENTIAL

(75) Inventor: Paul J. Valente, Berkley, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 681 days.

(21) Appl. No.: 11/880,376

(22) Filed: Jul. 20, 2007

(65) Prior Publication Data

US 2009/0019966 A1    Jan. 22, 2009

(51) Int. Cl.
*F16H 48/10* (2006.01)

(52) U.S. Cl. ..................... 475/249; 475/252

(58) Field of Classification Search .......... 475/249, 475/252
See application file for complete search history.

(56) References Cited

U.S. PATENT DOCUMENTS 2,269,734 A    1/1942    Powell (Continued)

FOREIGN PATENT DOCUMENTS

DE    4023332 A1    7/1990

(Continued)

*Primary Examiner*—Sherry L Estremsky
*Assistant Examiner*—Erin D Bishop
(74) *Attorney, Agent, or Firm*—Harness, Dickey & Pierce, P.L.C.

(57) ABSTRACT

A differential assembly for a vehicle includes a differential casing rotatable about an axis. The differential casing defines a cavity. A pair of side gears is disposed within the differential casing cavity. First and second pairs of pinion gears are rotatably positioned in the cavity in driving engagement with the side gears. A thrust block has circumferentially spaced apart recesses. Rotation of the thrust block is restricted by the first and second pairs of pinion gears being in communication with the recesses. A spring biases the thrust block into engagement with one of the side gears.

25 Claims, 4 Drawing Sheets

U.S. PATENT DOCUMENTS

| | | | |
|---|---|---|---|
| 3,375,736 A * | 4/1968 | Saari | 475/160 |
| 3,706,239 A * | 12/1972 | Myers | 475/226 |
| 3,893,351 A * | 7/1975 | Baremor | 475/232 |
| 4,365,524 A | 12/1982 | Dissett | |
| 4,677,876 A | 7/1987 | Dissett | |
| 4,722,244 A * | 2/1988 | Tsuchiya et al. | 475/230 |
| 4,751,853 A | 6/1988 | Dissett | |
| 5,055,096 A | 10/1991 | Riemscheid et al. | |
| 5,122,101 A | 6/1992 | Tseng | |
| 5,122,102 A | 6/1992 | Chludek et al. | |
| 5,139,467 A | 8/1992 | Carpenter | |
| 5,221,238 A | 6/1993 | Bawks et al. | |
| 5,292,291 A | 3/1994 | Ostertag | |
| 5,342,256 A | 8/1994 | Amborn et al. | |
| 5,389,048 A | 2/1995 | Carlson | |
| 5,492,510 A | 2/1996 | Bowerman | |
| 5,554,081 A | 9/1996 | Bowerman | |
| 5,580,326 A | 12/1996 | Teraoka | |
| 5,671,640 A | 9/1997 | Valente | |
| 5,730,679 A | 3/1998 | Ichiki et al. | |
| 5,733,216 A | 3/1998 | Bowerman | |
| 5,823,907 A | 10/1998 | Teraoka et al. | |
| 5,842,946 A | 12/1998 | Ichiki | |
| 5,951,431 A | 9/1999 | Downs et al. | |
| 5,957,801 A | 9/1999 | Barnes, II | |
| 5,983,754 A | 11/1999 | Tyson et al. | |
| 5,984,823 A | 11/1999 | Gage | |
| 6,013,004 A | 1/2000 | Gage et al. | |
| 6,053,838 A | 4/2000 | Gage | |
| 6,139,462 A | 10/2000 | Gage et al. | |
| 6,146,727 A * | 11/2000 | Dannels | 428/36.4 |
| 6,533,697 B2 | 3/2003 | Morse et al. | |
| 6,540,640 B2 | 4/2003 | Hibbler et al. | |
| 7,022,041 B2 | 4/2006 | Valente | |
| 7,147,585 B2 | 12/2006 | Valente | |
| 7,232,399 B2 | 6/2007 | Valente | |
| 2002/0025878 A1 | 2/2002 | Kam | |
| 2003/0101848 A1 * | 6/2003 | Handa et al. | 74/650 |
| 2005/0197229 A1 * | 9/2005 | Valente | 475/248 |

FOREIGN PATENT DOCUMENTS

| | | |
|---|---|---|
| EP | 356401 A2 | 2/1990 |
| GB | 2212231 | 11/1987 |
| JP | 2000110920 | 4/2000 |

* cited by examiner

PRE-LOAD MECHANISM FOR HELICAL GEAR DIFFERENTIAL

BACKGROUND

The present disclosure relates to differentials for use in automotive drivelines and, more particularly, to a helical gear differential having pre-loaded side gears.

Differentials of the type used in automotive drivelines generally may include a planetary gearset supported within a differential casing to facilitate relative rotation (i.e., speed differentiation) between a pair of output shafts. The planetary gearset may include helical side gears fixed for rotation with the ends of the output shafts, which are meshed with paired sets of helical pinion gears. This type of machine is known as a parallel axis helical gear differential.

In some differentials it may be desirable to pre-load the differential to provide a limited-slip driveline arrangement. Some differentials are equipped with springs to increase the force required to overcome friction between moveable differential components. The springs are engaged with the side gears and may exhibit wear.

SUMMARY

The present disclosure provides a differential assembly for a vehicle including a differential casing rotatable about an axis. The differential casing defines a cavity. A pair of side gears is disposed within the differential casing cavity. First and second pairs of pinion gears are rotatably positioned in the cavity in driving engagement with the side gears. A thrust block has circumferentially spaced apart recesses. Rotation of the thrust block is restricted by the first and second pairs of pinion gears being in communication with the recesses. A spring biases the thrust block into engagement with one of the side gears.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
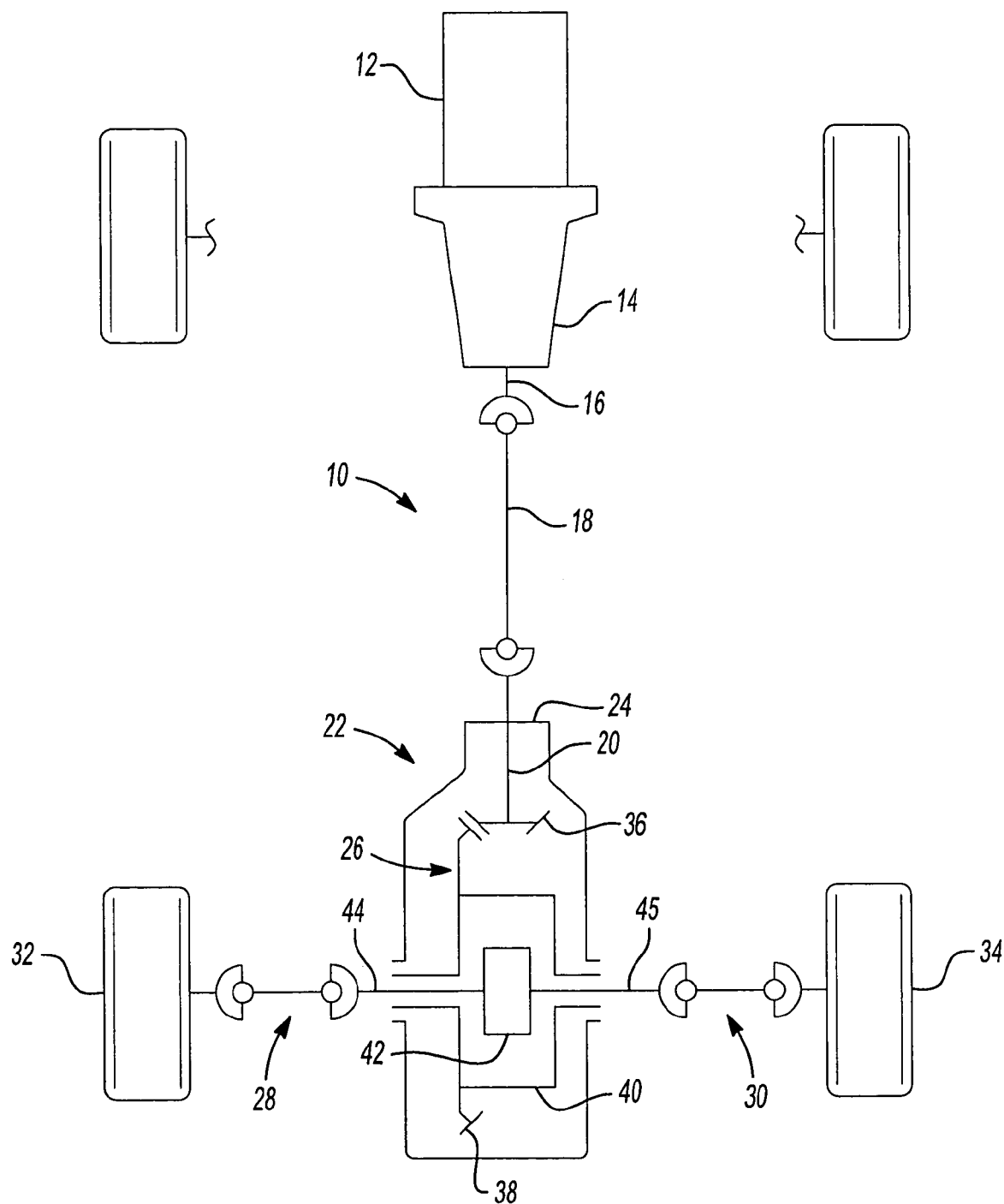
FIG. 1 is a schematic view of an exemplary motor vehicle including a differential assembly constructed in accordance with the teachings of the present disclosure.

The following description is merely exemplary in nature and is not intended to limit the present disclosure, application, or uses. It should be understood that throughout the drawings, corresponding reference numerals indicate like or corresponding parts and features.

With initial reference to FIG. 1, a drivetrain 10 for an exemplary motor vehicle may include an engine 12, a transmission 14 having an output shaft 16, and a propeller shaft 18 connecting the output shaft 16 to a pinion shaft 20 of a rear axle assembly 22. The rear axle assembly 22 includes an axle housing 24, a differential assembly 26 supported in the axle housing 24, and a pair of axle shafts 28 and 30, respectively, interconnected to a left and right rear wheel 32 and 34, respectively. The pinion shaft 20 has a pinion shaft gear 36 fixed thereto which drives a ring gear 38 that may be fixed to a differential casing 40 of the differential assembly 26. A gearset 42 supported within the differential casing 40 transfers rotary power from the casing 40 to a pair of output shafts 44 and 45 connected to the axle shafts 28 and 30, respectively, and facilitates relative rotation (i.e., differentiation) therebetween. While the differential assembly 26 is shown in a rear-wheel drive application, the present invention is contemplated for use in differential assemblies installed in transaxles for use in front-wheel drive vehicles, and/or in transfer cases for use in four-wheel drive vehicles.

Figure 2:
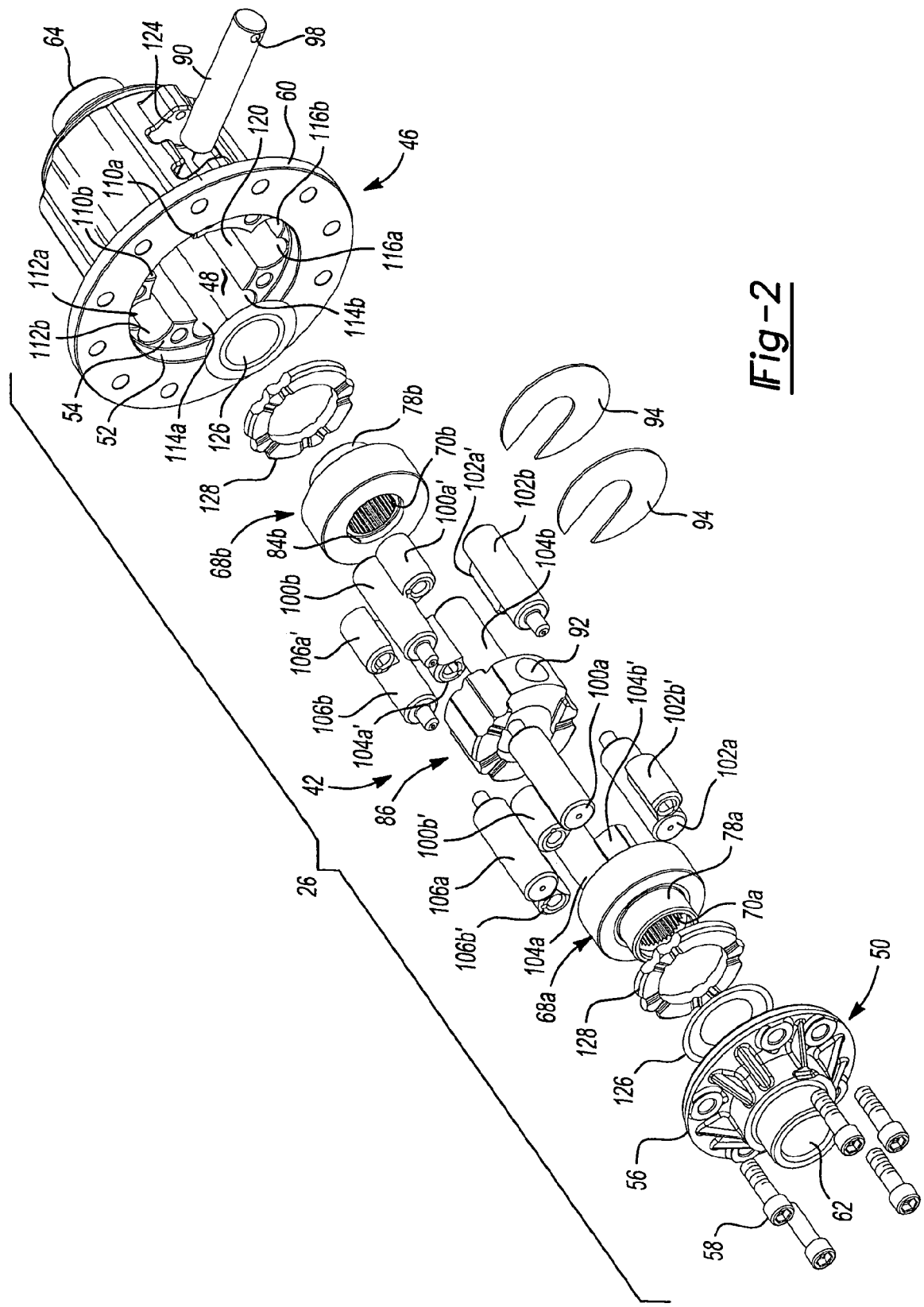
FIG. 2 is an exploded perspective view of the differential assembly of FIG. 1.
Figure 3:
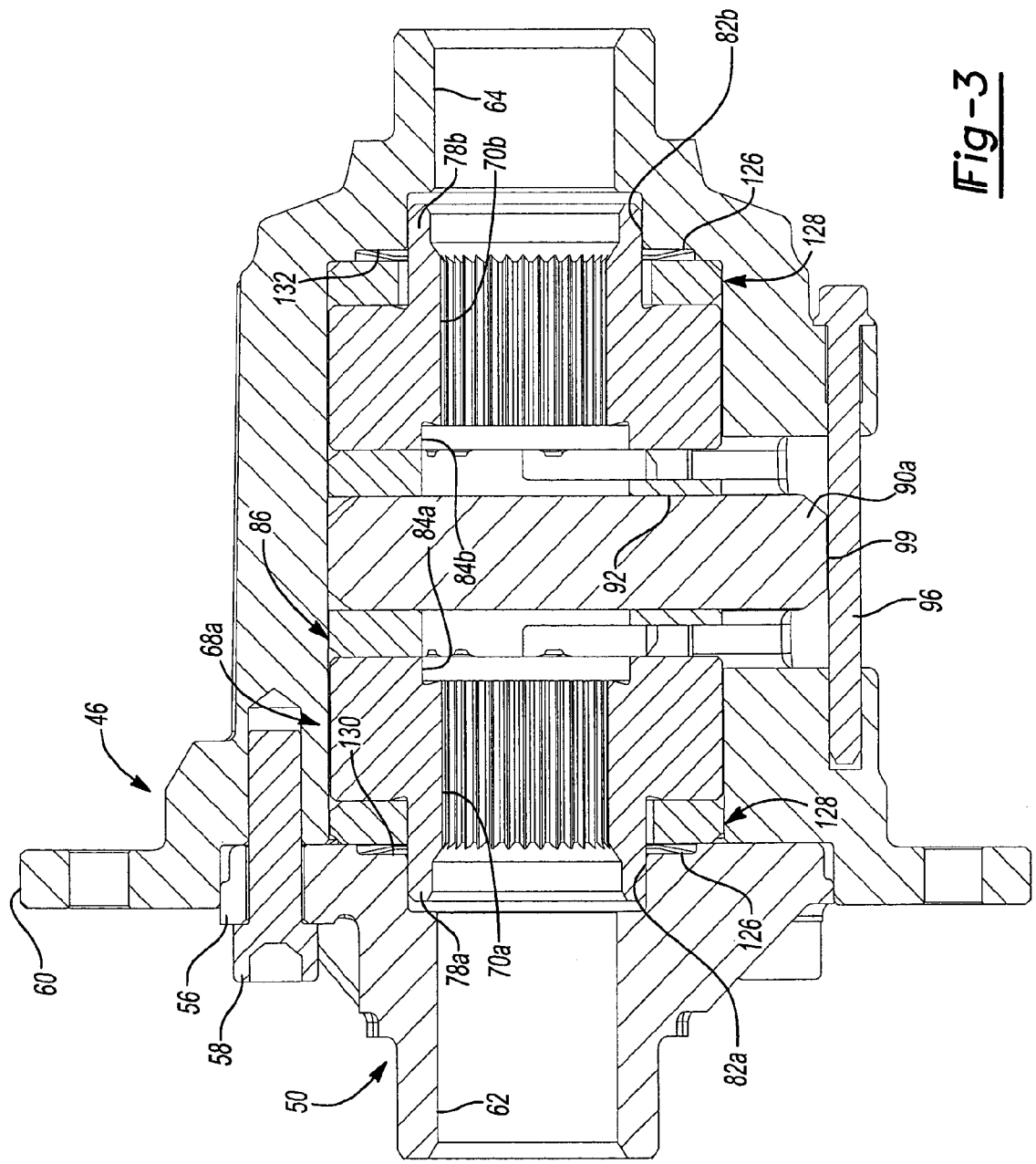
FIG. 3 is a cross-sectional side view of the differential assembly of FIG. 2.
Figure 4:
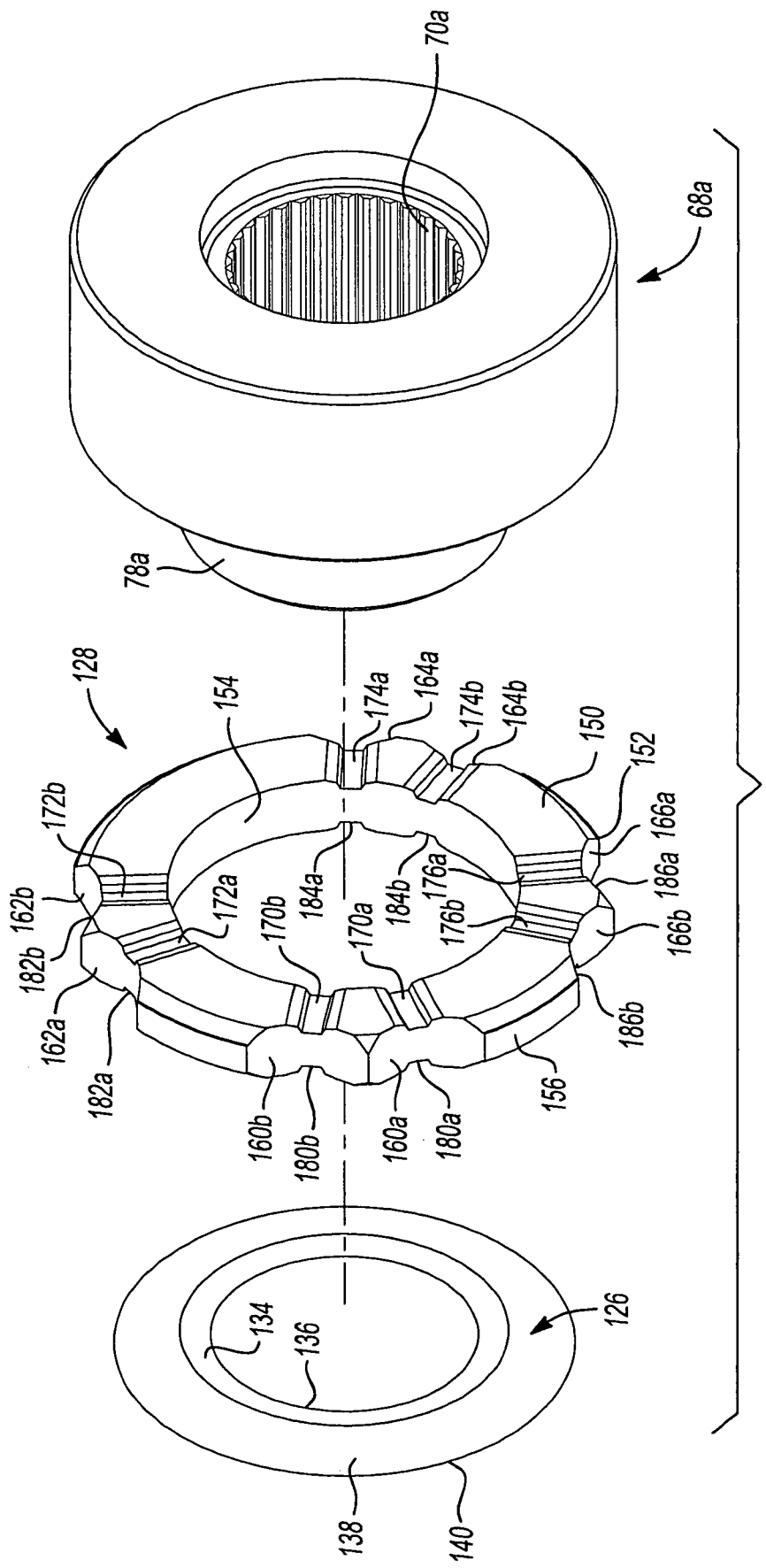
FIG. 4 is a partial exploded perspective view of the differential assembly of FIG. 1.

Turning now to FIGS. 2-4, the differential assembly 26 will be described in further detail. The differential assembly 26 may be a parallel-axis helical-gear type differential and includes the differential casing 40. The differential casing 40 includes a main drum or body 46, which defines an internal cavity or chamber 48, and an end cap 50. Body 46 includes a recess 52 having a mounting surface 54 shaped to mate with a radial flange 56 of cap 50. The body 46 and cap 50 are secured together by a plurality of bolts 58. As is known, a ring or bevel gear can be fixed to a radial flange 60 on the differential casing 40 to transfer rotary power (i.e., drive torque) thereto. The differential casing 40 defines a pair of axially aligned openings 62 and 64 in communication with the internal chamber 48. The axially aligned openings 62 and 64 are adapted to receive the end segments of the pair of driving output shafts 44 and 45 (FIG. 1), hereinafter referred to as axle shafts.

The differential assembly 26 includes the gearset 42 that is operable for transferring drive torque from the differential casing 40 to the output shafts 44 and 45 (FIG. 1) in a manner that facilitates speed differentiation therebetween. Gearset 42 may be a helical-type and may be disposed within the internal chamber 48. The gearset 42 includes a pair of side gears 68a and 68b. The side gears have internal splines 70a and 70b meshed with external splines, not specifically shown, on the corresponding output shafts 44 and 45 (FIG. 1). In addition, the side gears 68a and 68b include axial hubs 78a and 78b, respectively, which are retained in corresponding annular sockets 82a and 82b, formed in the main body 46 and the end cap 50 of the differential casing 40. The side gears 68a and 68b also include annular chambers 84a and 84b.

A spacer 86 may be located between the side gears 68a and 68b for limiting the amount of axial endplay of the side gears 68a and 68b within the differential case 40. A cross pin 90 extends through a passage 92 in the spacer 86 and controls endplay of the axle shafts 44 and 45 (FIG. 1). The outer cylindrical surface of cross pin 90 is sized to closely fit passage 92. As such, the longitudinal location of cross pin 90 is defined by the position of passage 92. C-shaped retainers, or C-clips 94, may be retained in the annular chambers 84a and 84b for preventing the axle shafts 44 and 45, respectively, from becoming disengaged with the side gears 68a and 68b. Cross pin 90 is radially retained in position by a longitudinally extending threaded fastener 96. Fastener 96 may extend through an aperture 98 formed in cross pin 90 as shown in FIG. 2 or may alternatively be located adjacent to an end face 99 of an alternate cross pin 90a shown in FIG. 3. As a result of the spacer 86 and fastener 96 being operable to locate cross pin 90, differential casing 40 need not include specially machined areas to locate and retain cross pin 90 and cross pin 90 need not contact casing 40.

The gearset 42 includes four sets of pinion pairs, 100a and 100b, 102a and 102b, 104a and 104b and 106a and 106b, respectively. For clarity, the pinion pairs 100a and 100b, 102a and 102b, 104a and 104b and 106a and 106b are hereinafter referred to as a first, second, third and fourth pair of pinion gears 100, 102, 104 and 106, respectively. Brake shoes 100a'-106b' cooperate with respective pinion gears 100-106.

The four sets of pinion gear pairs 100-106 are rotatably supported in complementary sets of pinion bores 110a and 110b, 112a and 112b, 114a and 114b, and 116a and 116b. The complementary sets of pinion bores 110a and 110b, 112a and 112b, 114a and 114b, and 116a and 116b are hereinafter referred to as a first, second, third and fourth pair of pinion bores 110, 112, 114, and 116, respectively. The pinion bores 110-116 are formed in raised hub segments 120 of the main body 46. The pinion bores 110-116 are arranged in paired sets such that they communicate with each other and with the internal chamber 48. In addition, the pinion bores 110-116 are aligned substantially parallel to the rotational axis A of the axle shafts 44 and 45 (FIG. 1).

A window opening 124 may be arranged on the differential casing 40 between the first and the fourth pair of pinion gears 100 and 106. C-clips 94 may be inserted through window opening 124 when drivingly coupling axle shafts 44 and 45 to differential assembly 26.

With reference to FIGS. 2, 3 and 4, spring washers 126 and thrust blocks 128 are positioned on axial hubs 78a and 78b of side gears 68a and 68b, respectively. One of the spring washers 126 is positioned within a recess 130 formed in cap 50. The other spring washer 126 is positioned within a recess 132 formed in body 46 as part of internal chamber 48. Recesses 130 and 132 maintain axial position of spring washers 126 to assure that clearance exists between axial hubs 78a, 78b and spring washers 126. Each thrust block 128 is positioned between one of spring washers 126 and one of side gears 68a, 68b. It should be appreciated that recesses 130, 132 may alternatively be formed in thrust blocks 128 rather than in differential casing 40.

Each spring washer 126 includes a substantially planar land 134 defining an opening 136. A frusto-conical portion 138 radially outwardly extends from planar land 134 and terminates at an outer edge 140. Each spring washer 126 may be constructed from a resilient material such as spring steel or an elastomeric plastic.

Each thrust block 128 is shaped as a ring having a first substantially planar contact surface 150 and an opposite substantially planar contact surface 152. The contact surfaces extend substantially parallel to one another. An inner cylindrical wall 154 extends between planar surfaces 150, 152. Thrust block 128 also includes an outer cylindrically shaped surface 156 extending from first surface 150 to second surface 152. Four sets of scallops 160a and 160b, 162a and 162b, 164a and 164b and 166a and 166b interrupt outer cylindrical surface 156. The complementary sets of scallops are hereinafter referred to as first, second, third and fourth pairs of scallops 160, 162, 164 and 166, respectively. The scallops 160-166 are sized and positioned to receive pinion gear pairs 100, 102, 104 and 106, respectively.

Pairs of troughs 170a and 170b, 172a and 172b, 174a and 174b and 176a and 176b are formed on contact surface 150 and extend in a radial direction from inner cylindrical wall 154 to a corresponding scallop 160-166. In similar fashion, another four sets of trough pairs 180 through 186 radially extend from inner cylindrical wall 154 to outer cylindrical surface 156 along contact surface 152. The four sets of troughs are identified as 180a, 180b, 182a, 182b, 184a, 184b, 186a and 186b. The troughs function to allow lubricant to pass therethrough.

After assembly of differential assembly 26, thrust blocks 128 are axially moveable within chamber 48 but restricted from rotating relative to casing 40 by pinion pairs 100-106. Spring washers 126 are in a compressed state loaded against thrust blocks 128 to transfer load through side gears 68a and 68b to spacer 86. The friction between side gears 68a, 68b and spacer 86 restricts relative rotation between the side gears 68a, 68b and casing 40 to provide limited slip differentiation. Thrust blocks 128 may be constructed from a number of materials, including plastic, having resistance to compression as well as resistance to wear due to direct sliding contact with side gears 68a and 68b.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without departing from the spirit and scope of the disclosure as defined in the following claims.

What is claimed is:

1. A differential assembly for a vehicle, comprising:
   a differential casing defining first and second pairs of pinion bores;
   first and second side gears disposed within said differential casing;
   a plurality of first pinion gears, each of said first pinion gears being received in an associated one of said first pinion bores and meshingly engaging said first side gear;
   a plurality of second pinion gears, each of said second pinion gears being received in an associated one of said second pinion bores and meshingly engaging said second side gear and a corresponding one of said first pinion gears;
   an annular thrust block received in said differential casing between said differential casing and said first side gear on a side of said differential casing opposite said second side gear, said thrust block having a radially outer perimeter with a plurality of recesses formed therein, each of said recesses receiving an associated one of said first pinion gears to thereby inhibit rotation of said thrust block relative to said differential casing; and
   a spring biasing said thrust block into engagement with said first side gear;
   wherein said first side gear is disposed between said spring and said second side gear such that said spring biases said first side gear toward said second side gear.

2. The differential assembly of claim 1 wherein said first side gear includes an axial hub that is received into an aperture in said thrust block.

3. The differential assembly of claim 2 wherein said spring is positioned within a spring recess formed in said differential casing.

4. The differential assembly of claim 3 wherein said thrust block includes a plurality of radially extending troughs extending from said aperture to an outer edge of said thrust block.

5. The differential assembly of claim 1 further including a spacer positioned between said first and second side gears, said spring transferring load through said spacer and the other of said first and second side gears.

6. The differential assembly of claim 5 further including a cross pin extending through apertures formed in said spacer.

7. The differential assembly of claim 5 further including another spring biasing another thrust block into engagement with said second side gear, wherein each of said first and second side gears are driven into contact with said spacer.

8. The differential assembly of claim 1 wherein said spring is positioned within a spring recess formed in said differential casing.

9. A differential assembly for a vehicle, comprising:
   a differential casing defining a cavity;
   a pair of side gear disposed within said differential cavity;
   first and second pairs of pinion gears rotatably positioned in said cavity in driving engagement with said side gears;
   a thrust block received between said differential casing and said first side gear on a side of said differential casing opposite said second side gear, said thrust block having circumferentially spaced apart recesses into which respective ones of said first and second pairs of pinion gears are received to thereby inhibit rotation of said thrust block relative to said differential casing; and a spring biasing said thrust block into engagement with said first side gear;

wherein said first side gear is disposed between said spring and said second side gear such that said spring biases said first side gear toward said second side gear.

10. The differential assembly of claim 9 wherein first side gear includes an axial hub that is received into an aperture in said thrust block.

11. The differential assembly of claim 10 wherein said spring is positioned within a spring recess formed in said differential casing.

12. The differential assembly of claim 10 wherein said thrust block includes a plurality of radially extending troughs extending from said aperture to an outer edge of said thrust block.

13. The differential assembly of claim 9 wherein said spring is positioned within a spring recess formed in said differential casing.

14. The differential assembly of claim 9 further including a spacer positioned between said first and second side gears, said spring transferring load through said spacer and the other of said first and second side gears.

15. The differential assembly of claim 14 further including a cross pin extending through apertures formed in said spacer.

16. The differential assembly of claim 15, wherein said cross pin is disposed generally perpendicular to an axis of the differential casing about which the first and second side pears are disposed for rotation relative to the differential casing.

17. The differential assembly of claim 16 wherein said cross pin is not fixed to said differential casing.

18. The differential assembly of claim 9 wherein said casing includes a body having a flange and a cap coupled to the body at a location radially inward of said flange.

19. The differential assembly of claim 9 wherein said thrust block is at least partly formed of plastic.

20. The differential assembly of claim 9 further including another spring biasing another thrust block into engagement with said second side gear, wherein each of said first and second side gears are driven into contact with said spacer.

21. A differential assembly for a vehicle, comprising:
a differential casing rotatable about an axis, said differential casing defining a cavity;
a pair of side gears disposed within said differential casing cavity;
first and second pairs of pinion gears rotatably positioned in said cavity in driving engagement with said side gears;
a thrust block having circumferentially spaced apart recesses, rotation of said thrust block being restricted by said first and second pairs of pinion gears being in communication with said recesses;
a spring biasing said thrust block into engagement with one of said side gears;
a spacer positioned between said side gears, said spring transferring load through said spacer and the other of said side gears; and
a cross pin extending through apertures formed in said spacer, said cross pin extending along an axis perpendicular to said axis of rotation of said casing at a location defined by said spacer apertures.

22. The differential assembly of claim 21 wherein said cross pin is not fixed to said differential casing.

23. A differential assembly for a vehicle, comprising:
a differential casing rotatable about an axis, said differential casing defining first and second pairs of pinion bores;
a pair of side gears disposed within said differential casing;
first and second pairs of pinion gears slidably and rotatably disposed in said first and second pairs of pinion bores, respectively;
a thrust block having spaced apart recesses in receipt of said first and second pairs of pinion gears; and
a spring biasing said thrust block into engagement with one of said side gears;
wherein said thrust block includes an aperture in receipt of an axial hub of said side gear;
wherein said spring is positioned within a recess formed in said casing;
wherein said thrust block includes a plurality of radially extending troughs extending from said aperture to an outer edge of said thrust block; and
wherein said spring is spaced apart from said side gears.

24. A differential assembly for a vehicle, comprising:
a differential casing rotatable about an axis, said differential casing defining first and second pairs of pinion bores;
a pair of side gears disposed within said differential casing;
first and second pairs of pinion gears slidably and rotatably disposed in said first and second pairs of pinion bores, respectively;
a thrust block having spaced apart recesses in receipt of said first and second pairs of pinion gears;
a spring biasing said thrust block into engagement with one of said side gears;
a spacer positioned between said side gears, said spring transferring load through said spacer and the other of said side gears; and
a cross pin extending through apertures formed in said spacer;
wherein said cross pin extends along an axis perpendicular to an axis of rotation of said casing.

25. A differential assembly for a vehicle, comprising:
a differential casing rotatable about an axis, said differential casing defining a cavity;
a pair of side gears disposed within said differential casing cavity;
first and second pairs of pinion gears rotatably positioned in said cavity in driving engagement with said side gears; and
a spacer positioned between the side gears to limit end play of said side gears within said casing, said spacer having apertures in receipt of a cylindrical cross pin extending perpendicular to an axis of rotation of said casing, said spacer positioning said cross pin at a location along said casing axis of rotation; and
a thrust block having circumferentially spaced apart recesses, rotation of said thrust block being restricted by said first and second pairs of pinion gears being in communication with said recesses and a spring biasing said thrust block into engagement with one of said side gears;
wherein said cross pin is not fixed to said differential casing.

* * * * *